Nov. 13, 1962  A. SKAVINSKY  3,063,655
VERTICAL-LIFT, HORIZONTAL FLIGHT AIRCRAFT
Filed Aug. 24, 1959  4 Sheets-Sheet 1
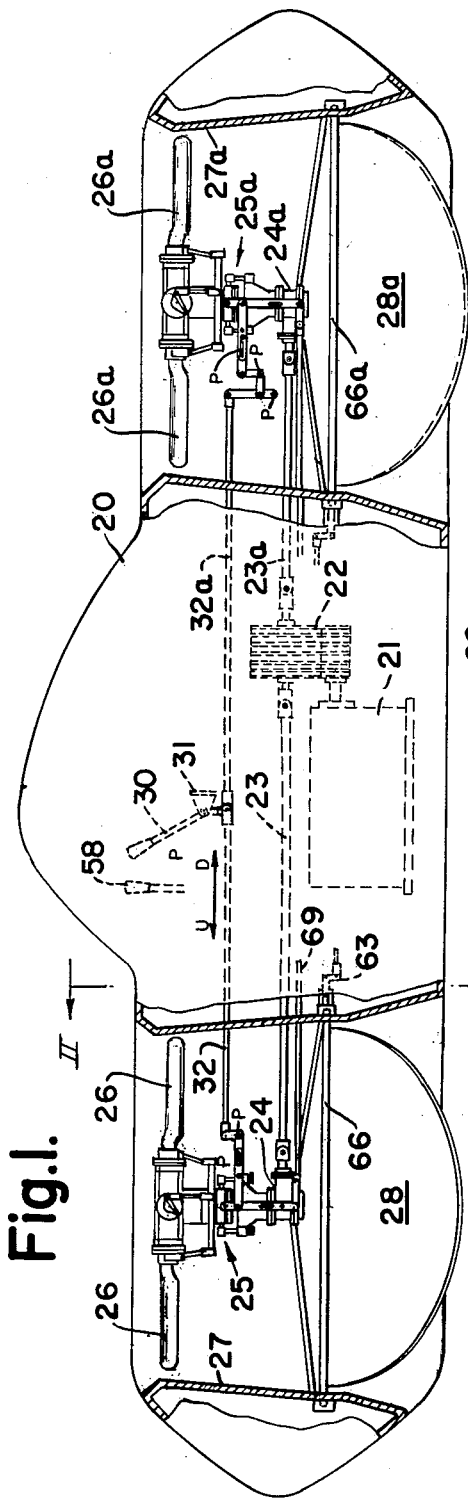
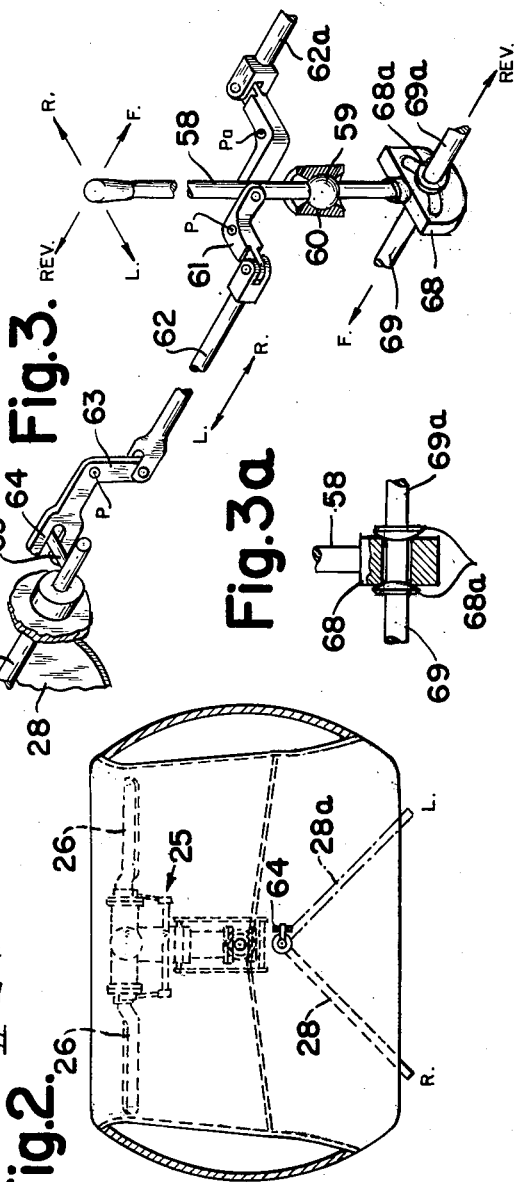
INVENTOR.
Anthony Skavinsky
BY
*William J. Ruano*
ATTORNEY.

Nov. 13, 1962 A. SKAVINSKY 3,063,655
VERTICAL-LIFT, HORIZONTAL FLIGHT AIRCRAFT
Filed Aug. 24, 1959 4 Sheets-Sheet 2

INVENTOR.
Anthony Skavinsky
BY
*William J. Ruano*
ATTORNEY

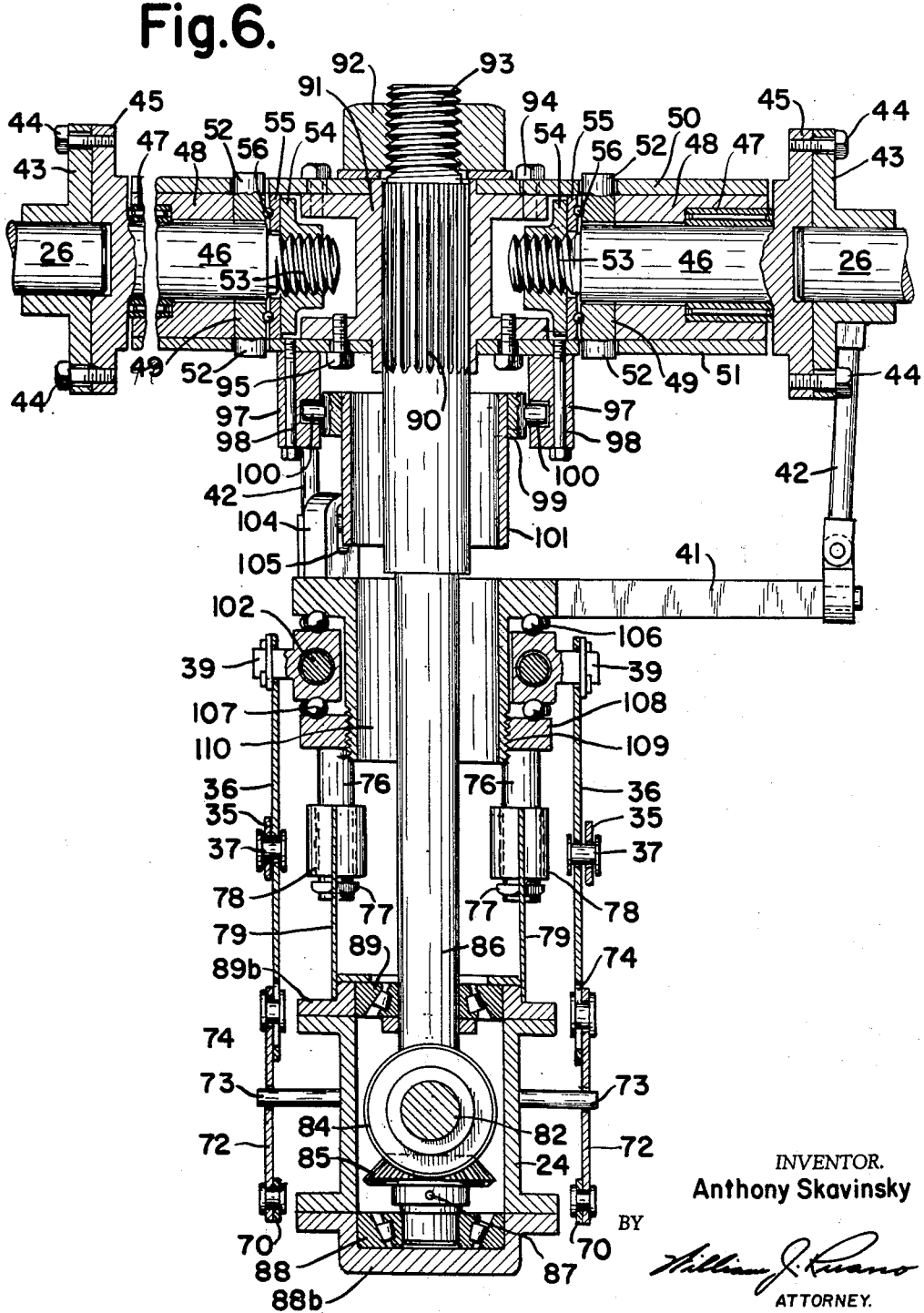

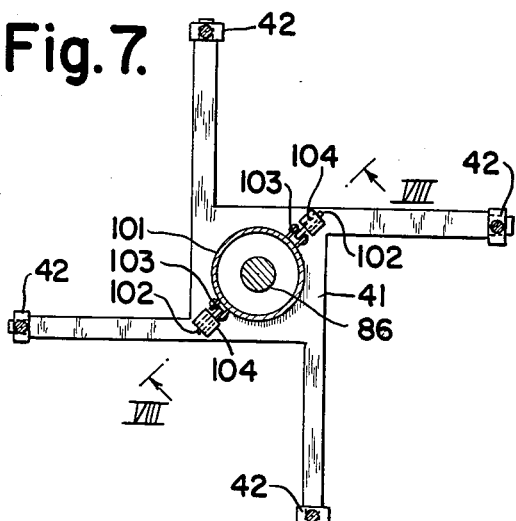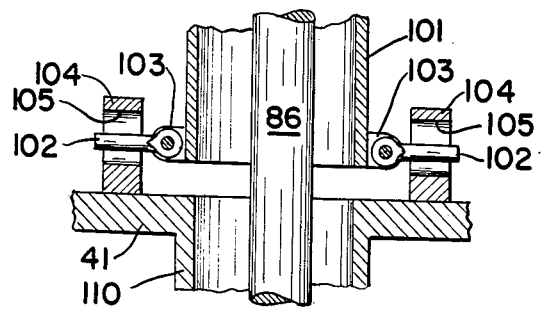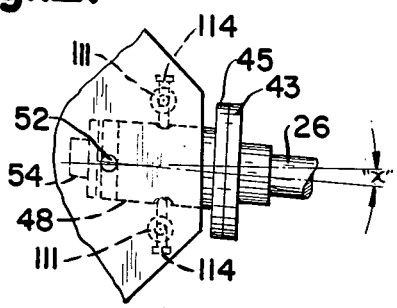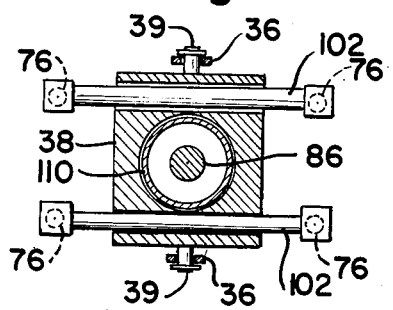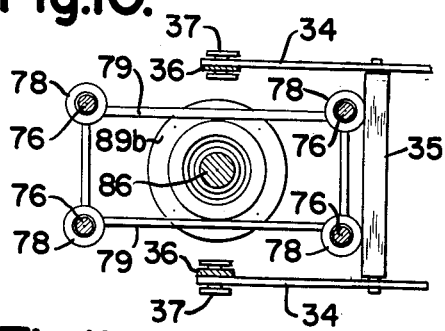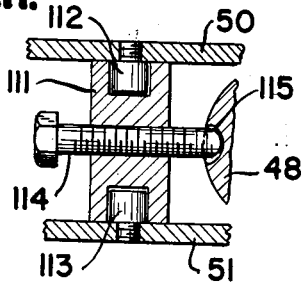

United States Patent Office 3,063,655
Patented Nov. 13, 1962

3,063,655
VERTICAL-LIFT, HORIZONTAL FLIGHT
AIRCRAFT
Anthony Skavinsky, Box 412, Cokeburg, Pa.
Filed Aug. 24, 1959, Ser. No. 835,771
5 Claims. (Cl. 244—23)

This invention relates generally to aircraft and, more particularly, to a helicopter-type of craft known as the "vertical take-off and landing (or "VTOL") type or "flying jeep."

An outstanding disadvantage of known VTOL types of aircraft is that they do not have sufficient lifting or driving force for a given size motor unit, therefore requiring abnormally large and heavy motors, also they are not maneuverable sufficiently to make them satisfactory and an acceptable type of aircraft.

An object of my invention is to provide a novel helicopter type of aircraft, of the "vertical take-off and landing" type which is devoid of the above named disadvantages and which enables the attainment of maximum lifting or driving power from the motor, therefore which is much more efficient than conventional craft of this type.

A more specific object of my invention is to provide a vertical take-off and landing type of aircraft having venturi type ducts with propellers of cyclically varying pitch, wherein the particular cycle may be varied or controlled to obtain lifting, lowering, right and left movements of the craft of varying degrees, thus providing vertical take-off and landing as well as horizontal flight.

Other objects and advantages of the invention will become more apparent from a study of the following description taken with the accompanying drawings wherein:

FIG. 1 is a side elevational view of a vertical take-off and landing and horizontal flight aircraft with vertical venturi-ducts shown in cross-section and embodying the principles of my invention;

FIG. 2 is a sectional view taken along line II—II of FIG. 1;

FIGS. 3 and 3a are enlarged, fragmentary perspective views of parts of the forward-reverse, left-right control mechanism;

FIG. 6 is an enlarged section of the rotor assembly taken along line VI—VI of FIG. 4;

FIG. 7 is a section taken along line VII—VII of FIG. 5;

FIG. 8 is a section taken along line VIII—VIII of FIG. 7;

Figure 5:
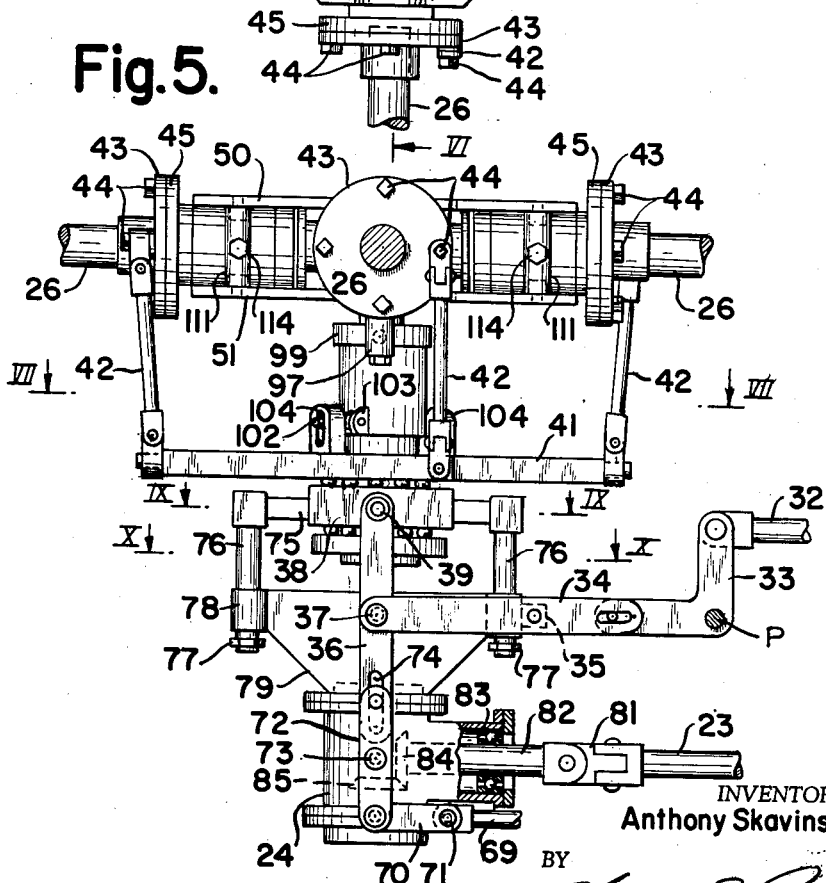
FIG. 5 is an elevational view of the structure shown in FIG. 4.

FG. 9 is a section taken along line IX—IX of FIG. 5;

FIG. 10 is a section taken along line X—X of FIG. 5;

FIG. 11 is an enlarged sectional view of a lag adjusting device; and

FIG. 12 is a top view of the device shown in FIG. 11.

Referring more particularly to FIGS. 1 and 2, the improved helicopter embodying the present invention includes a body 20 of any suitable design which is shown as having a forward and rear rotor but could have any other number or arrangement of vertical rotors as desired. An engine 21 is shown as centrally located but need not necessarily be in this position. The engine 21 drives a series of pulleys 22 rotatably turning shaft 23 for the forward rotor assembly and shaft 23a for the rear rotor assembly. The following description is for the forward rotor assembly 25, but it is to be understood that it also applies to the rear assembly which comprises identical parts identified by the same numerals but with the suffix "a."

Shaft 23 is connected to gear box 24 which supports rotor assembly 25 and drives rotor blades 26. The rotor assembly is shown housed in a venturi tube or duct 27 that could be of any desirable shape that will provide a venturi effect. Rudder 28 is rotatably supported in the bottom portion of venturi tube or duct 27 for effecting right or left movement, which will be hereinafter explained.

For vertical movement of the machine, I provide a control lever 30 having a handle of the type that, by twisting, controls the speed or r.p.m. on the engine 21, which type is well known to those familiar with the art. Pivotal movement of lever 30 on bracket 31 will move rods 32 and 32a which, in turn (as shown more clearly in FIG. 5), pivots the 90° bell cranks 33 about pivots P. This movement causes the 180° bell crank 34 to pivot about pivot 35 and effect vertical movement of link 36 through its connector pin 37. This vertical movement of link 36 moves thrust block 38 vertically by virtue of its pivotal connection 39—also it lifts spider 41 by virtue of its connection to 38 as will be explained later. This movement of spider 41, through its universal connecting or crank rods 42 connected off-center to flange 43 secured by bolts 44 to flanges 45, turns shaft 26 about its axis changing the pitch of the blades to either increase or decrease the angle of the blades attached thereto, thus providing the desired lift.

Flange 45 has an extended shaft 46 (see FIG. 6) that rotates within needle bearing 47 and housing 48. Thrust collar 49 is pivotally anchored between top plate 50 and bottom plate 51 by means of pins 52 which cooperate with the means for providing the lag angle that will be described later. The pitch rotation of the blade is provided by threads on the end of extended shaft 46 having nut 54 threaded thereon bearing against race 55 and bearings 56.

The forward-reverse or left-right movement is accomplished by control lever 58, shown more clearly in FIG. 3. Lever 58 is pivoted by means of ball 59 and socket 60, thus enabling full circular movement to obtain movement in various directions. The left-right control is obtained by left or right movements of the lever 58, thus operating the 90° bell crank 61 connected to rod 62 to move rods 62 and 62a in the directions indicated by the arrows to operate 90° bell crank 63 which, by means of a fork 64 (or a similar drive means) will partially rotate rudder 28 either to the right or left by means of pin 65 on shaft 66.

Movement to the right (as shown in FIG. 2) is accomplished by rotation of rudder 28 to the position shown by dash lines, causing air flow to provide a component of force in the proper direction. It will be noted that the rear rotor will have the opposite movement of its rudder, that is, to position 28a, to facilitate clockwise motion. This also stabilizes the action and prevents a spinning effect about the horizontal axis.

Figure 4:
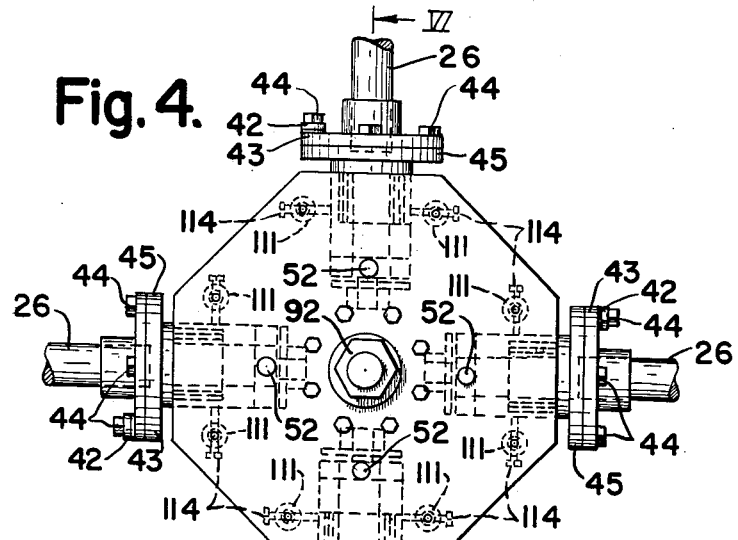
FIG. 4 is a plan view of the rotor assembly.

The forward-reverse control, operated by the lower portion of lever 58, is transmitted through connector 68, having dished washers 68a, to rods 69 and 69a in the directions indicated by the arrows. Rod 69 operates connector 70 by means of pin 71 which, in turn, revolves the 180° bell crank 72 around pivot 73. By the pin and slot 74 connection of link 36 thrust block 38 is moved horizontally along rod 75. Spider 41, being rigidly attached to thrust block 38, moves also in a horizontal direction and the universal crank rod 42, in the direction of movement increases the angle of attachment of blade 26 and decreases the angle of attachment of the blade 26a in the opposite direction, thus providing a greater thrust in one direction and a lesser thrust in the other, giving a resultant thrust in the desired direction. As can be seen best in FIG. 5, the rod 42 is off-set from the center of flange 43, thus causing the change in blade pitch mentioned, rotation being considered to be counter-clockwise as viewed in FIG. 4.

The vertical movement of thrust block 38 is obtained through association with rod 75 rigidly connected to shafts 76. That movement is limited or adjusted by means of nut 77 and stationary guides 78 fixed to bracket 79 which is welded to housing 89b.

Drive shaft 23, through universal joint 81, drives shaft 82 rotatably mounted in bearing 83 in gear box 24 and bevel gear 84. As shown in FIG. 6, gear 85 is driven by gear 84 and is attached to shaft 86 by pin 87. Bearings 88 and 89 are contained in housings 88b and 89b, respectively. The upper end of shaft 86 has splines 90 which engage corresponding splines of hub 91 which is secured, by means of nut 92 screwed onto threads 93, to the end of shaft 86. Plates 50 and 51 are attached to hub 91 by bolts 94 and 95, respectively.

Attached to bottom plate 51 by means of bolts 98 are pedestals 97 that transmit rotation to ring 99 by pins 100 attached thereto. Gimbal ring 99 has an extendable universal drive 101 which comprises a pin 102 pivotally mounted on brackets 103. Pin 102 engages dog 104 effecting rotation of spider 41. Slots 105 on dogs 104 allow for the vertical movement of spider 41. Spider 41 being rotatably mounted on thrust block 38 is provided with bearings 106 and 107 contained by means of the assembly held by nut 108 on threads 109 of the spider extension 110.

An additional feature of my invention is the provision for providing a predetermined lag angle on each individual blade, comprising a lag post 111 pivotally mounted between plates 50 and 51 (FIG. 11) by means of pivots 112 and 113, respectively. Threaded in post 111 for means of adjusting the lag angle is an adjusting bolt 114 that engages a socket 115 provided in the bearing housing 48. Through the adjustment of bolts 114, the blade assembly pivots about thrust collar pin 52, thus providing a predetermined angle of lag as shown in FIG. 12.

The above described aircraft thus provides for vertical lift or take-off as well as horizontal flight in any desired direction, and provides for control of the pitch of the propeller blades and cyclical variation of the blade pitch throughout each revolution of the blade to obtain a maximum amount of force in the desired direction of flight.

In operation, when it is desired to steer the aircraft to the right or left, lever 58 is swiveled about the ball joint 59 as a pivot and moved in the directions R or L, respectively, as indicated by the arrows. This will effect tilting of the rudders 28 and 28a in opposite directions—that is to say, if rudder 28 is moved to an angle of 45° with respect to a vertical plane the rudder 28a will be disposed at an angle substantially of 90° with respect to rudder 28 to cause the aircraft to move clockwise, that is, to the right. In order to move the aircraft to the left or counterclockwise, rudders 28 and 28a are moved in opposite directions than previously so as to again assume a 90° relationship therebetween to permit the aircraft to rotate substantially about its central axis in a counter-clockwise direction, that is, to the left.

For forward or reverse movement, control lever 58 is moved in the direction of the arrows F or Rev, respectively, as shown in FIG. 3. Thus, when lever 58 is moved to "reverse," plate 38 moves to the "reverse" position moving spider 41 and linkage 42 to change the pitch of the propeller blades 26 as described hereinabove. Thus by moving the control lever or stick 58 forwardly, forward movement is obtained, and by moving the control lever rearwardly, reverse movement of the aircraft is obtained.

It should be especially noted that as the propeller 26 makes a complete revolution, it will change pitch during the course of each revolution, that is, there will be a cyclical variation of propeller pitch. More specifically, assume that the aircraft is moving in a horizontal direction in a direction which may be denoted zero degree azimuth. Then as the propeller rotates between 0° and 90° azimuth, the propeller pitch will vary from about 9° to about 13° and in moving from 90° to 180° azimuth, the propeller pitch will vary from about 13° to about 15°, and in moving from 180° to 270°, the pitch will change from 15° to 9°, and in moving from 270° back to 0°, the pitch will be substantially maintained at 9°. In short, in the range between 270° and 90°, there is only enough pitch to keep the aircraft in suspension, whereas between 90° and 270°, the propeller bites more air to propel the aircraft forwardly.

If it is desired to move the aircraft in the opposite direction, that is in the direction of 180° azimuth, then from 0° to 90° azimuth the pitch will vary from about 15° to 9°, from 90° to 270°, it will be maintained at about 9°, and from 270° to 0° it will vary from about 9° to 15°. These figures are merely exemplary and not limiting—it being important only that the pitch will vary more through one angle of 180° than through the other angle of 180° to get a component of force or movement in a particular direction.

Thus it will be seen that I have provided an efficient and highly improved helicopter providing vertical lift or take-off as well as horizontal flight and steering in any desired direction, providing a high degree of efficiency and maneuverability not attainable heretofore in aircraft of this type.

While I have illustrated and described a single embodiment of my invention, it will be understood that this is by way of illustration only, and that various changes and modifications may be made within the contemplation of my invention and within the scope of the following claims.

I claim:

1. A helicopter type airplane of the vertical lift and landing type, comprising a plurality of ducts arranged vertically in different portions of the body of the airplane, propellers having blades of adjustable pitch and rotatable about the vertical axes of said ducts, control means for selectively varying the pitch of said blades to obtain different degrees of lifting force and a second control means for cyclically varying the pitch of said blades throughout each revolution thereof so as to obtain forward thrust.

2. A helicopter type airplane of the vertical lift and landing type, comprising a plurality of ducts arranged vertically at different portions of the body of the airplane, a propeller contained in each duct and rotatable about the central vertical axis thereof, a rudder contained in each duct below its propeller, and a control lever connected to said rudders to effect angular movement thereof in opposite directions, said propellers having blades of adjustable pitch, said control lever being also connected to said blades of adjustable pitch so as to vary the angle of the blades of said propellers in a variable manner during the course of each revolution so as to provide a greater thrust in any desired horizontal direction of travel.

3. Aircraft as recited in claim 2 together with means for selectively adjusting the lag angle of said propeller blades.

4. A helicopter type airplane as recited in claim 1 wherein said ducts are venturi ducts.

5. Aircraft as recited in claim 2 wherein said ducts are venturi ducts.

References Cited in the file of this patent

UNITED STATES PATENTS

| | | |
|---|---|---|
| 2,663,371 | Magill | Dec. 22, 1953 |
| 2,692,650 | Pullin | Oct. 26, 1954 |
| 2,835,458 | Dorman | May 20, 1958 |
| 2,838,257 | Wibault | June 10, 1958 |

FOREIGN PATENTS

| | | |
|---|---|---|
| 1,190,256 | France | Mar. 31, 1959 |

OTHER REFERENCES

Aviation Week, January 26, 1959, pages 56 and 57.